United States Patent
Toivonen

(10) Patent No.: US 6,970,903 B1
(45) Date of Patent: Nov. 29, 2005

(54) DISTRIBUTED COMPONENT SYSTEM MANAGEMENT USING MACHINE-INDEPENDENT ACTIVATION REQUESTS

(75) Inventor: Anthony L. Toivonen, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/430,691

(22) Filed: Oct. 29, 1999

(51) Int. Cl.[7] .............................................. G06F 15/16
(52) U.S. Cl. ..................... 709/203; 709/201; 709/202; 709/224; 709/225; 709/226; 709/227; 709/229; 718/1; 718/100; 719/311; 719/312; 719/313; 719/330
(58) Field of Search ................................ 709/202–203, 709/219, 224, 225, 248, 227–229, 310, 300, 709/238, 223, 734; 717/4–5, 1; 702/203; 345/335; 395/712; 719/311–313, 330; 718/1, 718/100; 707/3; 713/2, 201; 370/390

(56) References Cited

U.S. PATENT DOCUMENTS

| | | | | |
|---|---|---|---|---|
| 5,517,645 A | * | 5/1996 | Stutz et al. .................. | 709/300 |
| 5,832,219 A | * | 11/1998 | Pettus ......................... | 709/203 |
| 5,872,968 A | * | 2/1999 | Knox et al. ................... | 713/2 |
| 5,884,024 A | * | 3/1999 | Lim et al. .................... | 713/201 |
| 5,920,699 A | * | 7/1999 | Bare ........................... | 709/225 |
| 5,920,725 A | * | 7/1999 | Ma et al. ..................... | 395/712 |
| 5,925,098 A | * | 7/1999 | Freund et al. ................ | 709/203 |
| 5,999,179 A | * | 12/1999 | Kekic et al. .................. | 345/734 |
| 6,006,264 A | * | 12/1999 | Colby et al. .................. | 709/226 |
| 6,052,718 A | * | 4/2000 | Gifford ........................ | 709/219 |
| 6,067,559 A | * | 5/2000 | Allard et al. ................. | 709/202 |
| 6,067,580 A | * | 5/2000 | Aman et al. .................. | 709/330 |
| 6,104,392 A | * | 8/2000 | Shaw et al. .................. | 345/335 |
| 6,141,686 A | * | 10/2000 | Jackowski et al. ........... | 709/224 |
| 6,141,696 A | * | 10/2000 | Goertzel et al. ............. | 709/310 |
| 6,175,869 B1 | * | 1/2001 | Ahuja et al. ................. | 709/226 |
| 6,181,697 B1 | * | 1/2001 | Nurenberg et al. .......... | 370/390 |
| 6,208,952 B1 | * | 3/2001 | Goertzel et al. ............. | 702/203 |
| 6,223,217 B1 | * | 4/2001 | Pettus ......................... | 709/219 |
| 6,226,684 B1 | * | 5/2001 | Sung et al. .................. | 709/238 |
| 6,247,057 B1 | * | 6/2001 | Barrera, III ................. | 709/229 |
| 6,263,491 B1 | * | 7/2001 | Hunt ........................... | 709/203 |
| 6,263,492 B1 | * | 7/2001 | Fraley et al. ................. | 717/5 |
| 6,324,681 B1 | * | 11/2001 | Sebesta et al. ............... | 717/1 |
| 6,349,333 B1 | * | 2/2002 | Panikatt et al. .............. | 709/223 |
| 6,470,389 B1 | * | 10/2002 | Chung et al. ................ | 709/227 |
| 6,523,022 B1 | * | 2/2003 | Hobbs .......................... | 707/3 |
| 6,581,110 B1 | * | 6/2003 | Harif et al. .................. | 709/248 |
| 6,678,732 B1 | * | 1/2004 | Mouko et al. ............... | 709/227 |
| 6,760,763 B2 | * | 7/2004 | Jennings et al. ............. | 709/224 |

OTHER PUBLICATIONS

Stal et al. "An Architectural view of Distributed Objects and Components in CORBA, Java RMI, and COM/DCOM".*
Component Object Model (COM), DCOM and Related Capabilities, http://www.sei.cmu.edu/str/descriptions/com$_{13}$body.html.*

* cited by examiner

Primary Examiner—Saleh Najjar
Assistant Examiner—ThuHa Nguyen
(74) Attorney, Agent, or Firm—Fish & Richardson P.C.

(57) ABSTRACT

A distributed component system in which component object model (COM) clients can create components at run-time without knowledge of the specific names or capabilities of the network nodes servicing that creation is desirable. The components in the system are distributed among a client node and its server nodes. The system includes a client augmentation module to intercept and process client activation requests, and server augmentation modules monitoring activation requests from the client node. The server augmentation modules allow the client node to create remote components on the available server nodes without monitoring a detailed state of the network.

14 Claims, 6 Drawing Sheets

DISTRIBUTED COMPONENT SYSTEM MANAGEMENT USING MACHINE-INDEPENDENT ACTIVATION REQUESTS

BACKGROUND

The invention relates to distributed component system enhancement.

The explosive growth of the Internet, the increasing popularity of personal computers, and the advances in high-speed network access have brought distributed computing into the main stream. To simplify network programming and to realize component-based software architecture, a distributed computing system called a distributed component object model (DCOM) has been introduced. However, current remote activation mechanisms afforded by the DCOM are inadequate in servicing machine-independent requests. Although a mechanism is available within the confines of a single machine to request an identity independent implementation of some interface, such as in component categories, no integral facility exists for querying the network as a whole for any available host capable of servicing a request independent of host identity.

Since DCOM activation requests depend on the client failures become evident to the client only after the activation request has been committed to the server by the client, at which time it may be too late for the client to mitigate the problem. There is often no mechanism available for the client to dynamically attempt connections with other anonymous and viable nodes in response to a failure of the currently used server because of the static nature of a DCOM based distributed system. At best, a response to the server failure often requires informing application users based on the network configuration, and at worst, it may require a complete recompilation of source code.

SUMMARY

A distributed component system in which component object model (COM) clients can create components at run-time without knowledge of the specific names or capabilities of the network nodes servicing that creation is disclosed.

The components in the system are distributed among a client node and its server nodes. The system includes a client augmentation module to intercept and process client activation requests, and server augmentation modules monitoring activation requests from the client node. The client augmentation module processes the activation requests by multicasting the specifics of the request to the network. The server augmentation modules allow the client node to create remote components on the available server nodes without monitoring a detailed state of the network.

Other features and advantages will become apparent from the following description and drawings, and from the claims.

DETAILED DESCRIPTION

Figure 1:
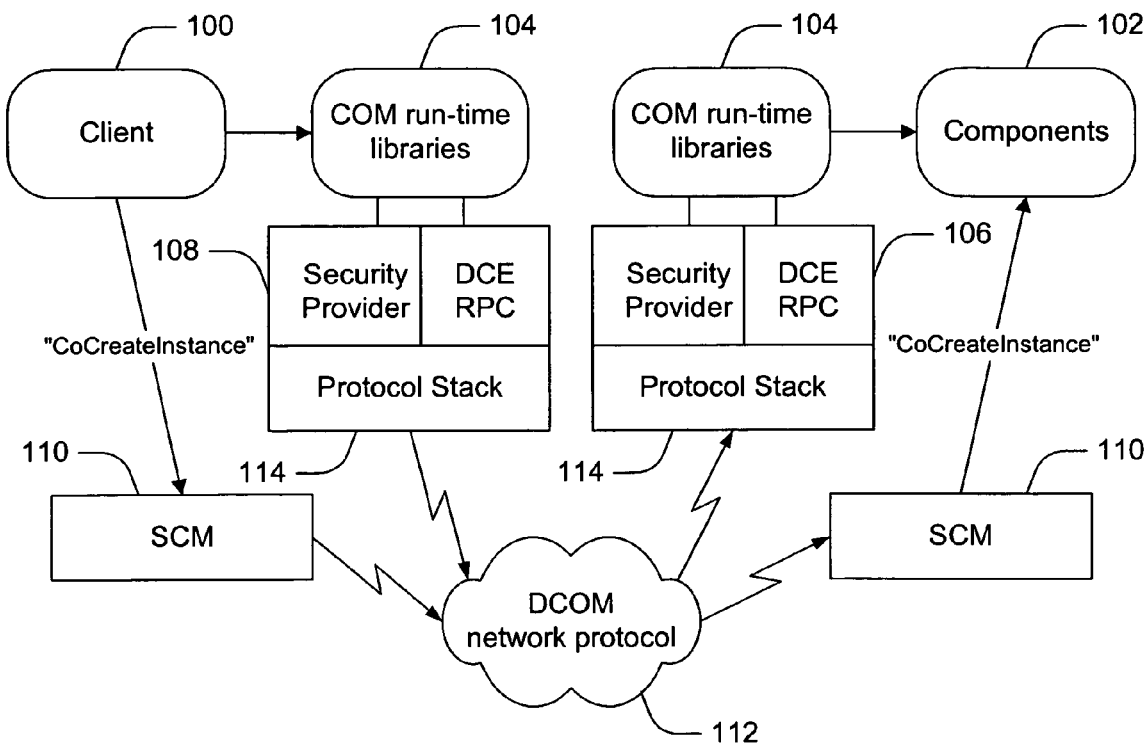
FIG. 1 is a block diagram of a distributed component object model (DCOM) architecture.

A basic requirement of a distributed system is an ability to create components. A block diagram of the distributed component object model (DCOM) architecture, shown in FIG. 1, defines how components 102 and their clients 100 interact over a network. The network can be a local-area network (LAN), a wide-area network (WAN), or the Internet.

In object-oriented programming and distributed object technology, a component 102 is a reusable program building block that can be combined with other components in the same or other computers in a distributed network to form an application. Components can be deployed on different servers in a network and communicate with each other for needed services. Examples of a component include an interface to a database manager and a single button in a graphical user interface (GUI).

Component object model (COM) run-time libraries 104 provide object-oriented services to clients 100 and components 102. The libraries 104 use Distributed Computing Environment (DCE) Remote Procedure Call (RPC) 106 and security provider 108 to generate standard network packets that conform to the DCOM network-protocol 112 standard. The packets are placed on a protocol stack 114 before being shipped to the network.

In the COM environment, object classes are named with globally unique identifiers (GUIDs). When GUIDs are used to refer to particular classes of objects, they are called Class Identifiers (CLSIDs). The CLSIDs are 128-bit integers, used in RPC systems like DCOM, which provide a decentralized namespace for object classes. For a DCOM environment, the object creation mechanism in the COM libraries 104 is enhanced to allow object creation on other machines. In order to be able to create a remote object, the COM libraries 104 need to know the network name of the server. Once the server name and the CLSID are known, a portion of the COM libraries called the Service Control Manager (SCM) 110 on the client machine connects to the SCM on the server machine and requests creation of the object.

When indicating a remote server name at the time of an object creation, the DCOM allows clients 100 to maintain location transparency. That is, clients 100 need not know whether the component 102 is running locally or remotely. Therefore, when the remote server name is made part of the server component's configuration information on the client machine, clients 100 do not have to maintain or obtain the server location. All a client needs to know is the server name and the CLSID of the component. It simply calls 'CoCreateInstance,' and the COM libraries transparently create the correct component on the server machine.

Figure 2:
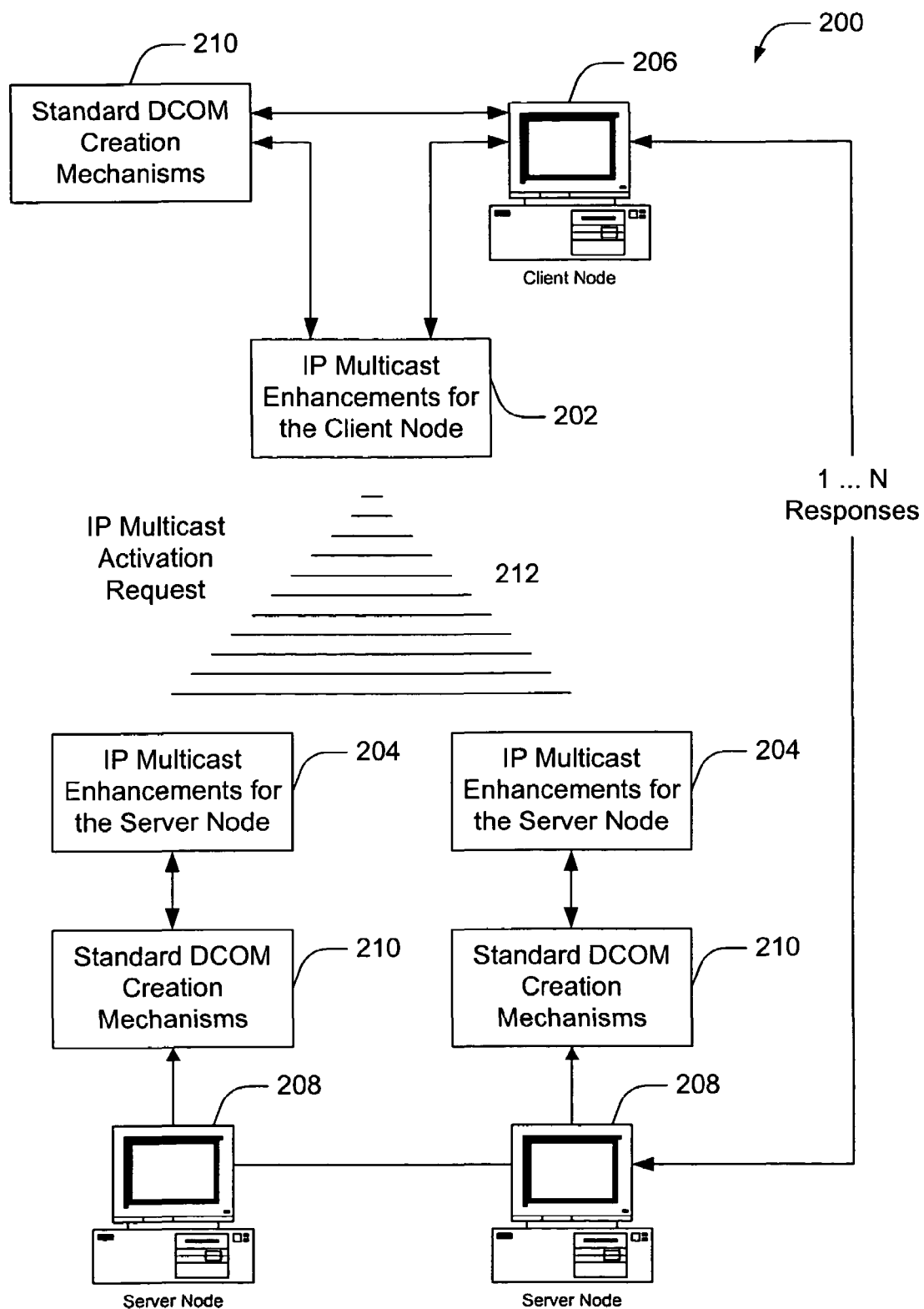
FIG. 2 shows an enhanced DCOM framework.

An enhanced distributed component object model (DCOM) framework 200 that augments the existing activation capabilities of the DCOM service is illustrated in FIG. 2. The enhanced DCOM framework 200 takes the location transparency of the standard DCOM one step further by allowing the clients to maintain transparency in the name or capability of the network node servicing the request. Thus, a client in the enhanced DCOM framework 200 does not need to know even the server name of the component and the client can process activation requests in a machine-independent manner.

An augmentation/enhancement to the standard DCOM creation mechanisms 210 comprises two parts: a first part 202, called an Internet Protocol (IP) augmentation for the client node, intercepts and processes client activation requests; and a second part 204, called an IP augmentation for the server node, monitors requests on the server machines 208.

The IP augmentation for the client node 202 intercepts the standard client activation request and broadcasts the specifics of the request to the network 212. The request is for a list of server IP addresses or universal naming convention (UNC) names of servers that have the ability to service a request for a specific CLSID or for an interface via a CLSID directly. The IP augmentation for the server node 204 monitors a specific port that is tied to a multicast IP address. Depending on the mode of operation, the IP augmentation 204 can simply return the server IP address or use the standard DCOM creation mechanism to create, package, and return an interface pointer in a location transparent form.

Figure 3:
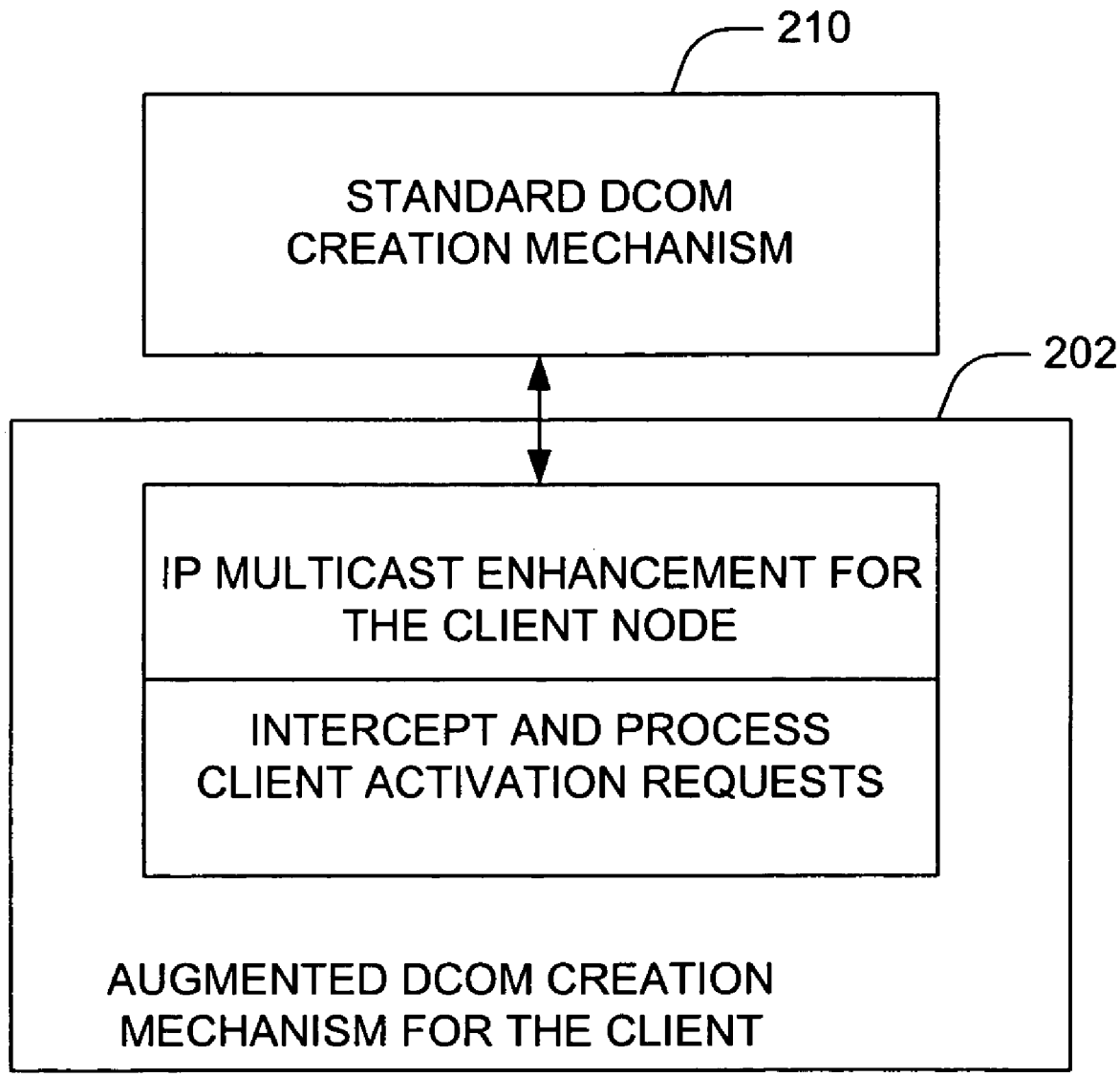
FIG. 3 is a block diagram of an IP augmentation module for the client node.

A block diagram of the IP augmentation module for the client node 202 is shown in FIG. 3. The augmented DCOM creation mechanism 202 includes multicast enhancements that intercept and process client activation requests from the standard DCOM creation mechanism 210.

Figure 4:
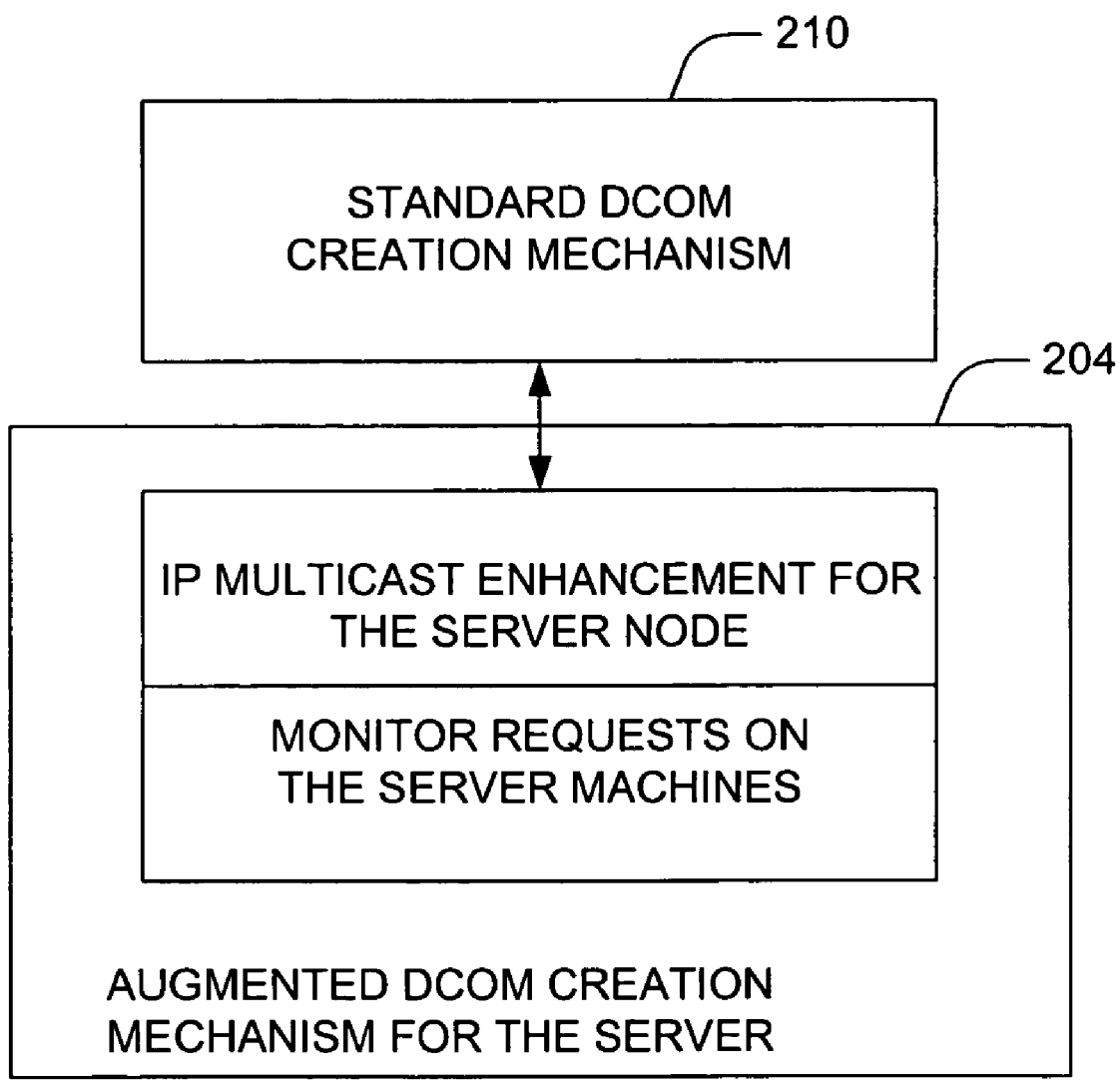
FIG. 4 is a block diagram of an IP augmentation module for the server node.

A block diagram of the IP augmentation module for the server node 204 is shown in FIG. 4. The augmented DCOM creation mechanism 204 includes multicast enhancements that monitor requests on the server machines.

Figure 5:
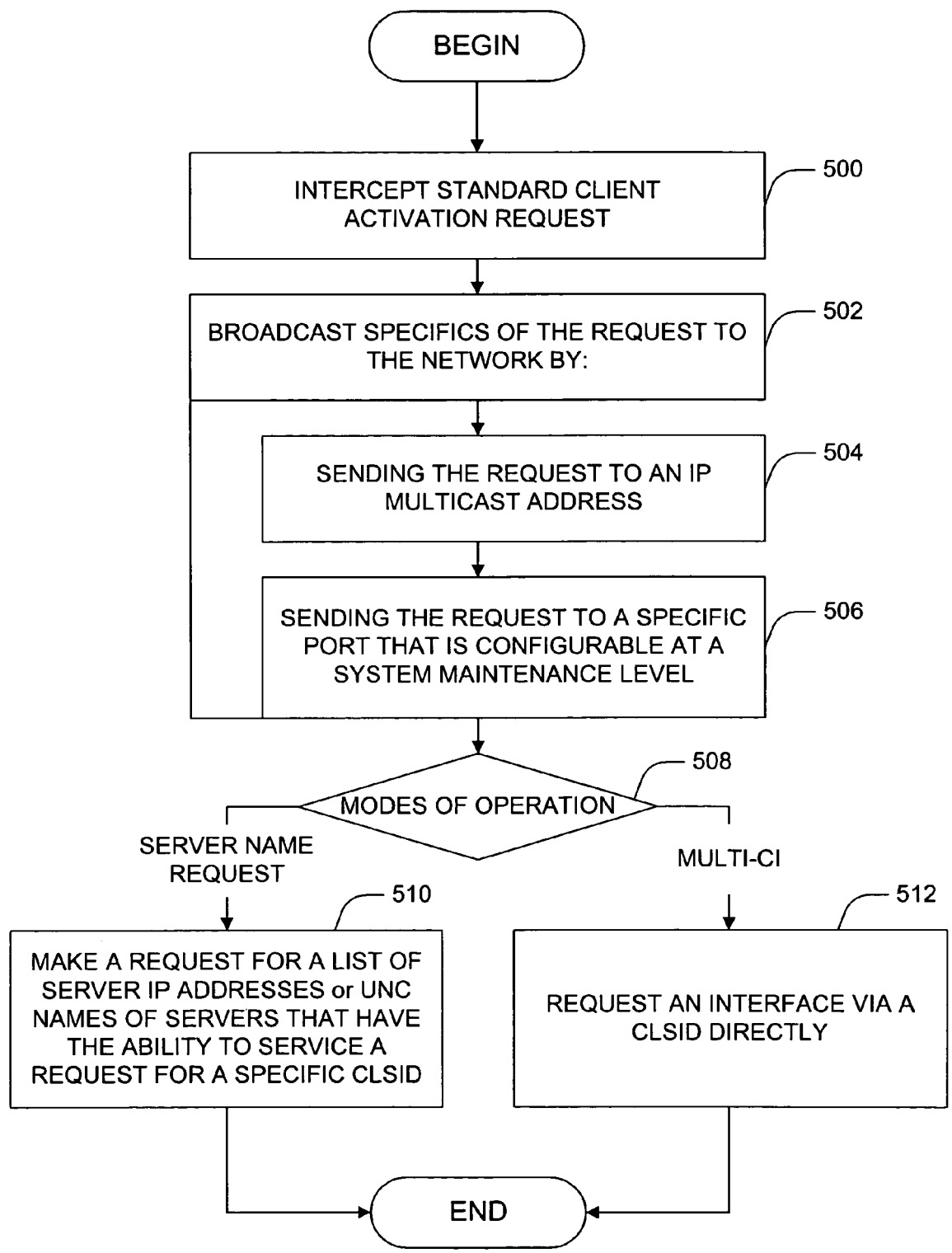
FIG. 5 is a flow diagram of the IP augmentation module for the client node.

FIG. 5 shows a flow diagram of the IP augmentation module for the client system 202. The diagram illustrates a process by which a COM client 206 triggers the creation of components at run-time without knowledge of the specific name or capabilities of the network node servicing that creation request.

The process begins when the augmentation module 202 intercepts standard client activation request, at step 500. The augmentation module 202 then broadcasts the specifics of the request to the network, at step 502. This broadcast is sent to an IP multicast address (step 504) and a specific port that is configurable at a system maintenance level (step 506). The mechanism by which this broadcast takes effect is entirely implementation dependent and has no direct impact on the system at a higher level.

The client 206 may request component activation using two different modes of operation, at step 508. In a Server Name Request (SNR) mode (step 510), the client makes a request for a list of server IP addresses or UNC names of servers that have the ability to service a request for a specific CLSID. In a Multi-CoCreateInstance (Multi-CI) mode (step 512), the client bypasses server naming and requests an interface via a CLSID directly.

In the SNR mode, the client 206 provides a CLSID, an Interface Identifier (IID), a maximum and minimum response wait time, a maximum and minimum response count, and whether server names or IP addresses should be returned. This type of request will result in the return of one to many server names or IP addresses capable of servicing a DCOM activation request for the particular CLSID and IID requested. Once the client has these server names, it can then proceed as normal using the standard DCOM mechanism for remote activation.

The primary advantage of the SNR mode to the client is the flexibility it affords. A client can make intelligent decisions prior to a DCOM activation request based on what it now knows, or can discern, from the list of available servers it received. For example, a known unreliable or failure prone server could be dropped in favor of a different server from the list.

In the Multi-Ci mode, the parameters for the client request include a maximum response wait time as as well as maximum and minimum response count just as with the SNR mode, but the returned values will instead be the interface pointers requested. The IP augmentation module for the client node 202 creates location independent references to objects on the network by using an existing DCOM protocol known as an Object RPC (ORPC). The ORPC is a set of definitions that extends the standard DCE RPC protocol. It specifies how calls are made across the network and how references to objects are represented and maintained.

ORPC uses standard RPC packets, with additional DCOM specific information, in the form of an interface pointer identifier, conveyed as additional parameters on calls and replies. The interface pointer identifier is used to identify a specific interface on a specific object on a server machine where the call will be processed.

One of the parameters of an activation response packet is the marshaled interface pointer which is represented in an object reference (OBJREF) structure. The OBJREF structure is a data type that represents a reference to an object and contains a signature field of hex value 0x5747454D. This sequence which reads 'MEOW' in ASCII is useful when scanning for the object reference packet.

Figure 6:
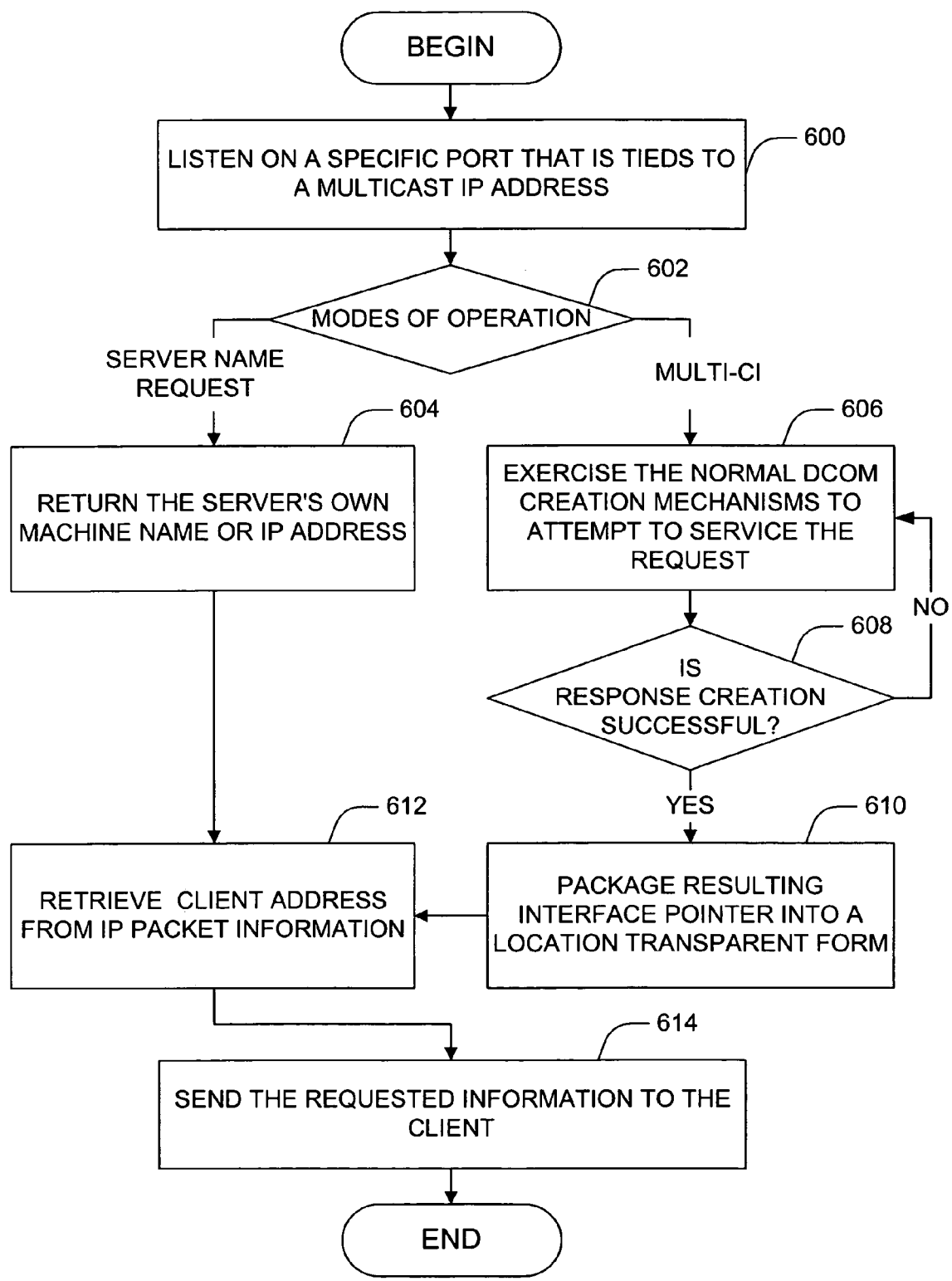
FIG. 6 is a flow diagram of the IP augmentation module for the server node.

A flow diagram of the IP augmentation module for the server system 202 is shown in FIG. 6. The system 202 monitors and listens on a specific port that is tied to the multicast IP address, at step 600. Again, the server may service the component activation request by the client using two different modes of operation, at step 602.

In the SNR mode, the server machine 208 simply returns the server's own machine name or IP address to the client (step 604).

In the Multi-CI mode, when the broadcast activation request arrives, the IP augmentation module for the server machine 202 exercises the normal DCOM creation mechanisms to attempt to service the request (step 606). If this response creation is successful (step 608), then the resulting interface pointer will be packaged into a location transparent form and sent to the client for use (step 610). Specifically, a DCOM remote OBJREF in the form of a MEOW packet, described above, can be used to send the requested information to the client. Finally, the augmentation module for the server machine 202 retrieves the client address from the IP packet information (step 612) and sends the requested information to the client (step 614).

The above augmentations or enhancements to the existing functionality afford the server machine 208 the ability to implement intelligence regarding the requests it will respond to and those it will ignore. By responding only if the response creation is successful, the process prevents network reconfiguration or recompilation of source code. Further, since the reception of broadcasted activation requests is tied to a specific port, the configuration of the available network servers can be modified to result in different replies for clients that initiate a broadcast request.

Some of the advantages of the enhanced DCOM framework 200 which offers a generalized activation scheme include easy implementation of virtual DCOM servers and flexible organization and distribution of the server components that can be dynamically altered without the client systems being aware of the changes. The virtual DCOM servers are comprised of several physical server nodes on the network.

Other embodiments are within the scope of the following claims. For example, a client could broadcast a request to the network for a specific CLSID which would result in the eventual return of 1 to N marshaled COM class factory interface pointers. Also, a client could specify a specific CLSID/IID pair and receive some number of marshaled interface pointers that correspond to the unique IID requested. Furthermore, the client can broadcast a desired COM category identifier used for generalized creation, and subsequently receive some number of interface pointers without regard to any particular underlying implementation or identity.

What is claimed is:

1. A distributed component system in a network comprising:
   a client node configured to process client activation requests; and
   a server node configured to monitor activation requests from the client node, said server node operating to enable the client node to activate remote components on available server nodes without specific names or capabilities of nodes in the network servicing the requests,
   wherein said remote components comprise reusable program building blocks that are combinable with one or more other components in a distributed network to form an application, and
   wherein the client node comprises an augmentation module configured to intercept a remote component activation request from a client-based remote component creation mechanism and configured to broadcast information about the intercepted remote component activation request.

2. The system of claim 1, wherein said network comprises a local-area network, a wide-area network, or Internet.

3. The system of claim 1, wherein said activation requests are processed by a client node that includes enhancements to a network protocol of the client node.

4. The system of claim 1, wherein said server node include enhancements to a network protocol of the server node.

5. A method comprising:
   receiving a machine-independent activation request from a client in a network, wherein said activation request comprises a request to activate a reusable program building blocks in the network to form an application;
   multicasting said activation request to the network, wherein said receiving a machine-independent activation request and said multicasting said activation request occur in a client-augmentation module configured to intercept a remote component activation request from a client-based remote component creation mechanism to enable a client node to activate remote components on available server nodes without specific names or capabilities of nodes in the network servicing activation requests; and
   receiving capability information from servers available to service said activation request.

6. The method of claim 5, wherein the capability information includes a list of server IP addresses or UNC names of servers that have the ability to service a request for a specific CLSID.

7. A method comprising:
   monitoring at a server a specific port to receive a machine-independent client activation request within a network from a client-augmentation module configured to intercept and broadcast a remote component activation request from a client-based remote component creation mechanism to enable a client node to activate remote components on available server nodes without specific names or capabilities of nodes in the network servicing activation requests, wherein said activation request comprises a request to activate a reusable program building blocks in the network to form an application;
   retrieving a client address from an IP packet associated with the request; and
   returning capability information of the server to the client address.

8. The method of claim 7, wherein monitoring the specific port includes monitoring a port that is tied to a multicast IP address.

9. The method of claim 7, wherein returning includes returning a server IP address.

10. A method comprising:
    receiving a machine independent activation request from a client in a network, wherein said activation request comprises a request to activate a reusable program building block that is combinable with one or more other reusable program building blocks in the network to form an application;
    multicasting said activation request to the network, wherein said receiving and said multicasting occur in a client-augmentation module configured to intercept a remote component activation request from a client-based remote component creation mechanism to enable a client node to activate remote components on available server nodes without specific names or capabilities of nodes in the network servicing activation requests;
    requesting capability information from servers available to service said activation request;
    monitoring a port that is tied to a multicast IP address;
    retrieving a client address from an IP packet; and
    returning capability information of a server to the client address.

11. A computer program, residing on a computer readable medium, the program comprising executable instructions that enable a computer to:
    receive a machine-independent activation request from a client in a network, wherein said activation request comprises a request to activate a reusable program building block that is combinable with one or more other reusable program building blocks in the network to form an application;
    multicast said activation request to the network, wherein the instructions that enable the computer to receive a machine-independent activation request and multicast said activation request reside in a client-augmentation module configured to intercept a remote component activation request from a client-based remote component creation mechanism to enable a client node to activate remote components on available server nodes without specific names of capability of nodes in the network servicing activation requests; and
    receive capability information from servers available to service said activation request.

12. A computer program, residing on a computer readable medium, the program comprising executable instructions that enable a computer to:

monitor at a server a specific port that is tied to a multicast IP address to receive a machine-independent client activation request within a network from a client-augmentation module configured to intercept and multicast a remote component activation request from a client-based remote component creation mechanism to enable a client node to activate remote components on available server nodes without specific names or capabilities of nodes in the network servicing activation requests, wherein said activation request comprises a request to activate a reusable program building block that is combinable with one or more other reusable program building blocks in the network to form an application;

retrieve a client address from an IP packet associated with the request; and return capability information of the server to the client address.

13. A computer program, residing on a computer readable medium, the program comprising executable instruction that enable a computer to:

receive a machine-independent activation request from a client in a network, wherein said activation request comprises a request to activate a reusable program building block that is combinable with one or more other reusable program building blocks in the network to form an application;

multicast said activation request to the network, wherein the instructions that enable the computer to receive a machine-independent activation request and multicast said activation request reside in a client-augmentation module configured to intercept a remote component activation request from a client-based remote component creation mechanism to enable a client node to activate remote components on available server nodes without specific names or capabilities of nodes in the network servicing activation requests;

request capability information from servers available to service said activation request;

monitor a port that is tied to a multicast IP address;

retrieve a client address from an IP packet; and return capability information of the server to the client address.

14. A distributed component network comprising:

client nodes configured to be able to request activation of remote components at run-time without specific names or capabilities of nodes servicing those requests, at least one of said client nodes comprising an augmentation module configured to intercept a remote component activation request from a client-based remote component creation mechanism and configured to broadcast information about the intercepted remote component activation request; and server nodes operating to monitor the requests and respond appropriately to service the requests, wherein said remote components comprise reusable program building blocks that are combinable with one or more other components in the distributed component network to form an application.

* * * * *